Sept. 18, 1928.
C. A. FRAZIER
PIPE BAND
1,684,666
Original Filed June 1, 1925    2 Sheets-Sheet 1
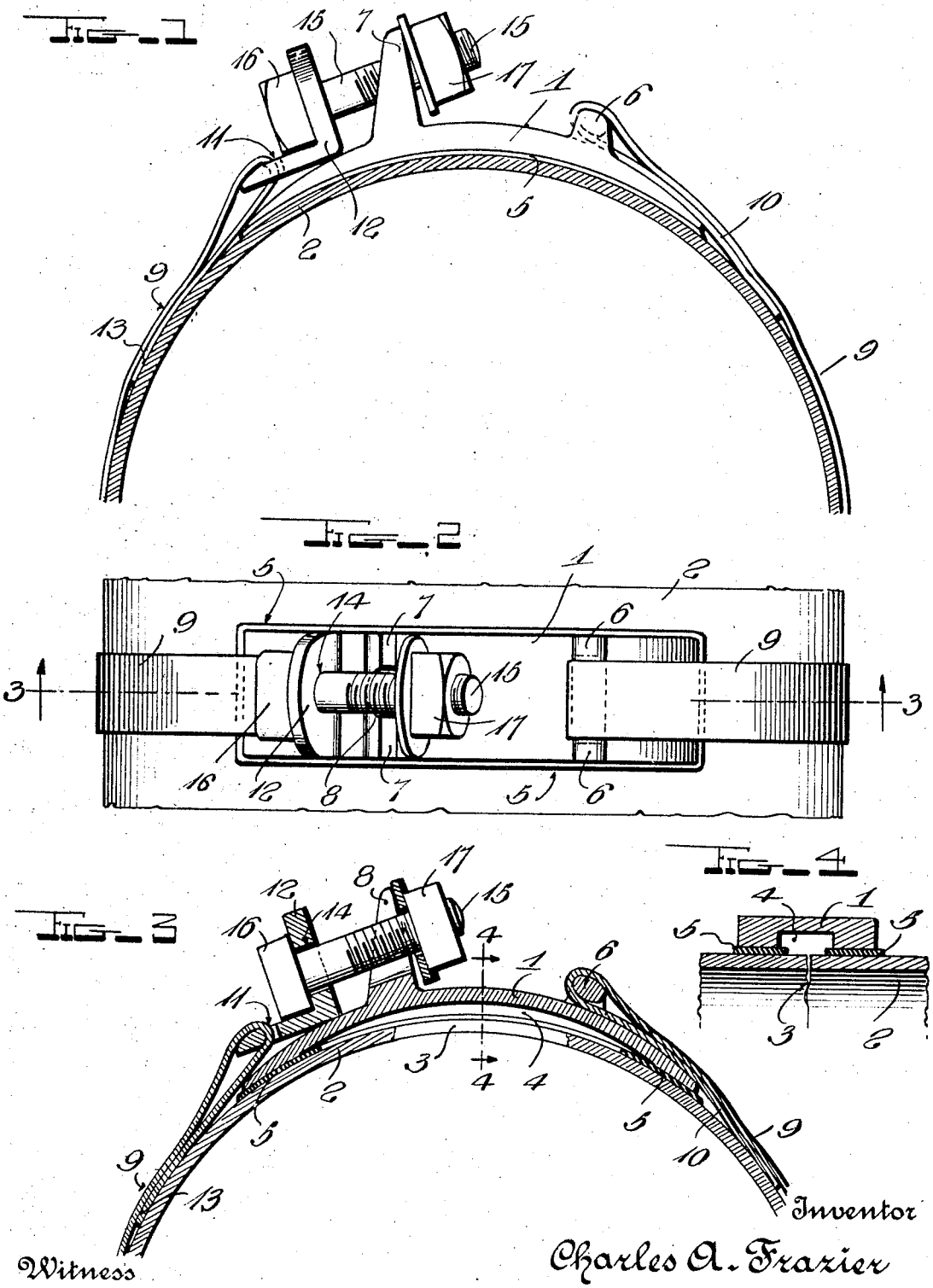
Witness
Inventor
Charles A. Frazier
By H. B. Willson & Co.
Attorneys Sept. 18, 1928. 1,684,666
C. A. FRAZIER
PIPE BAND
Original Filed June 1, 1925   2 Sheets-Sheet 2
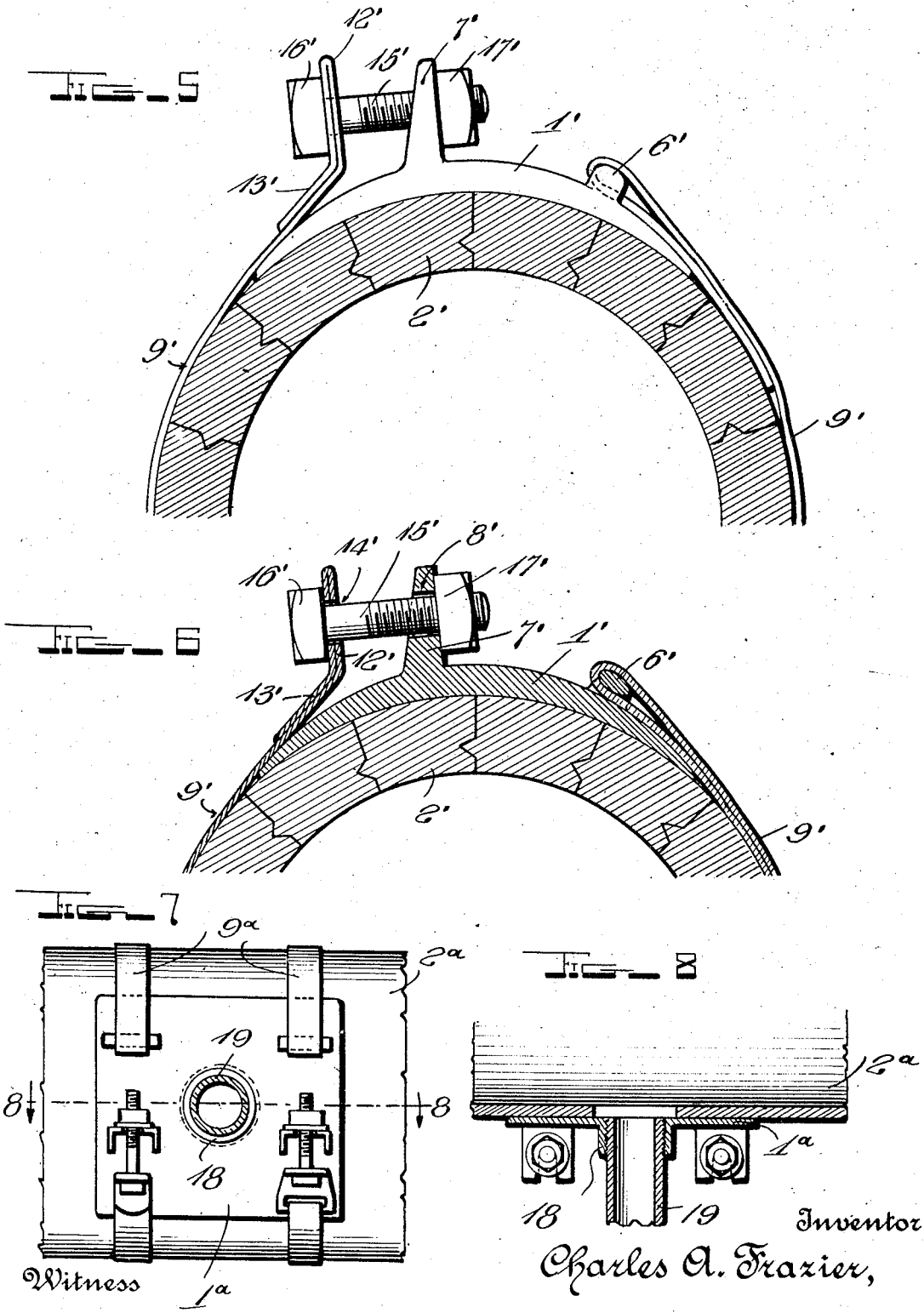

Patented Sept. 18, 1928.

1,684,666

UNITED STATES PATENT OFFICE.

CHARLES ALBERT FRAZIER, OF FAIR OAKS, CALIFORNIA.

PIPE BAND.

Application filed June 1, 1925, Serial No. 34,143. Renewed July 27, 1928.

The present invention relates to pipe bands.

The principal object of the invention is to generally improve upon and simplify the construction of pipe bands as well as to provide one which is very strong and durable and is well adapted for the purpose to which it is designed.

The device is used as a clamp around a pipe or the like and also as a device for repairing or patching a leak in a pipe or the like.

According to the present invention, the device includes a metal plate adapted for disposition tightly against the outer side of a pipe, this plate being provided or formed on its inner side with a recess to permit it to straddle a rivet head or other small projection or fit over a leak in the pipe. In order to hold the plate tightly against the outer side of a pipe, a pipe-encircling band is used. The ends of this band are coupled to the plate in such a manner that the band may be tightened so as to bring the plate into tight engagement with the outer side of the pipe.

The invention will be more readily understood by reference to the following detailed description and the accompanying drawings which form a part of this specification.

In the above-mentioned drawings:

Fig. 1 is a side elevation of a pipe band constructed in accordance with the principles of the present invention, said view showing the band clamped around a metal pipe;

Fig. 2 is a plan view of the plate shown in Fig. 1 and the end portions of the band which is coupled to such plate;

Fig. 3 is a central vertical sectional view of the device taken substantially on the plane indicated by the line 3—3 of Fig. 2;

Fig. 4 is a transverse sectional view taken substantially on the plane indicated by the line 4—4 of Fig. 3;

Fig. 5 is a side elevation of another embodiment of the invention, showing it clamped around a wooden pipe or tubular member;

Fig. 6 is a central vertical longitudinal sectional view of the device shown in Fig. 5;

Fig. 7 is a plan view of a pipe tap constructed in accordance with the principles of the present invention; and Fig. 8 is a horizontal sectional view of the tap shown in Fig. 7, taken substantially on the plane indicated by the line 8—8 of Fig. 7.

In the embodiment of the invention illustrated in Figs. 1 to 4 inclusive of the drawings, the numeral 1 designates a metal plate which is curved or otherwise shaped so as to fit tightly against the outer side of a pipe such as is represented by the numeral 2. This plate 1 may be used to patch a leak 3 in the pipe 2, so that in Fig. 3 of the drawings, it is shown as being disposed over or opposite the leak 3. When used in this connection, it is essential that the plate 1 fit tightly against the outer side of the pipe 2, and therefore to secure this tight engagement, the inner side of the plate 1 is provided with a recess 4. The recess 4 does not extend to any of the edges of the plate 1, but terminates short of all edges so that the portions of the inner side of the plate 1 surrounding the recess 4 may bear tightly against the outer side of the pipe 2 or in fact against a packing element here illustrated as a rubber gasket 5, which is interposed between the outer side of the pipe 2 and the inner side of the plate 1.

Formed upon the plate 1 and extending outwardly therefrom is a loop 6, and also formed upon the outer side of the plate 1 and extending outwardly is a lug 7. The loop 6 is preferably disposed adjacent one end of the plate 1 while the lug 7 is preferably disposed adjacent the other end of the plate 1. The lug 7 is formed so that a bolt may be extended through the same. In the present instance, it is provided with a slot 8 for this purpose.

The plate 1 is rigid and non-yielding and is arcuate in shape with its ends tapered off as shown. The loop 6 is positioned a considerable distance back of the tapered adjacent edge, as is likewise the lug 7. Thus the free ends of the band 9 lie flat over these tapered and rigid unyielding ends of the plate as the clamp is mounted on the pipe to be drawn together. Thus the crushing or bending tendency of the drawing action is taken almost entirely by the rigid plate 1 and the pipe will remain in perfect round, as is necessary, no matter how tightly the clamp may be drawn together.

The L-shaped coupling 12 pivots on its apex against the arcuate plate 1 so that the L rocks on that pivot as the nut 17 is tightened. This causes the coupling to slide easily and also adds a progressively increasing leverage to the pull against the band as the upright leg of the L is gradually moved toward a position parallel to the member 8, thus materially aiding in securing an exceptional tight cinch of the band around the pipe.

The numeral 9 represents a band. By preference, this is flat and it has one of its ends extended through the loop 6 and then doubled under itself as at 10, so that in this way, this end of the band is coupled to the plate 1. The band 9 is intended to encircle a pipe and in Figs. 1 and 3, it is shown extending around the pipe 2. The other end of the band 9 extends through an opening 11 formed in one end of an L-shaped coupling member 12 and its end doubled under itself as indicated at 13. The other end of the member 12 extends outwardly from the outer side of the plate 1 and is apertured as at 14 to receive a bolt 15. This bolt 15 not only extends through the aperture 14 but also through the slot 8 in the lug 7. The head 16 of the bolt 15 bears against one side of the outwardly extending end of the member 12, while a nut 17 threaded upon the end of the bolt 15 bears against the side of the lug 7 remote from the member 12. By this construction, the band 9 may be adjusted, so that the plate 1 may be brought into tight engagement with the outer side of the pipe 2.

In Figs. 5 and 6 of the drawings, another embodiment of the invention is illustrated. In this case, the plate 1' is constructed exactly the same as the plate 1 is constructed, with the exception that the plate 1' is not provided with a recess upon its inner side to correspond with the recess of the plate 1. Then, the band 9' with which the plate 1' is provided, is not coupled to an L-shaped coupling member to correspond to the coupling member 12 shown in Figs. 1, 2 and 3. Instead of this, the end of the band 9' which is not coupled to the loop 6' is bent upon itself as at 13' and extended outwardly from the plate 1' and this outwardly extended portion or lug is provided with an aperture 14' to correspond with the aperture 14 formed in the coupling member 12 of the embodiment disclosed in Figs. 1 to 4 inclusive. The bolt 15' extends through the aperture 14' and through an aperture 8' formed in the lug 7'. The head 16' of the bolt 15 bears against the outer side of the lug 12', and the nut 17' threaded upon the end of the bolt 15' bears against the outer side of the lug 7'.

The embodiment illustrated in Figs. 5 and 6, of course, may be used in connection with a metal pipe such as shown in Fig. 2, but in Figs. 5 and 6, it is illustrated as being clamped around a wooden pipe 2'.

In Figs. 7 and 8, a still further embodiment of the invention is illustrated. In this case, the plate 1ª is more or less square and is formed at its central portion with an outwardly extending internally threaded nipple 18 to receive a pipe 19, by means of which one side of the pipe 2ª around which the plate 1ª is clamped, may be tapped.

Since the plate 1ª is considerably wider in the direction of the length of the pipe 2ª than the plates 1 and 1' are, instead of using only the one band, a plurality of pipe-encircling bands 9ª are used. In the present instance, two of the bands 9ª are used, one being disposed at each end of the plate 1ª. The two bands 9ª may be constructed alike and may be coupled to the plate 1ª the same as illustrated in Figs. 1, 2 and 3, or as illustrated in Figs. 5 and 6. The left hand band shown in Fig. 7 is coupled to the plate 1ª in the manner shown in Figs. 5 and 6, while the right hand band of Fig. 7 is coupled to the plate 1ª in the manner shown in Figs. 1, 2 and 3.

From the foregoing description taken in connection with the accompanying drawings, the construction, use and advantages of the invention will be readily understood.

It is obvious that numerous changes in form, proportion, and in many of the details of construction may be made without departing from the spirit and principle of the invention, and without sacrificing any of the advantages thereof, so that it is to be understood that such may be done within the meaning and scope of the appended claims.

I claim:

1. A pipe clamp comprising a rigid arcuate plate to fit the pipe, the ends of the plate being tapered, a fastening member on the top surface of the plate at a spaced distance from each end thereof, a flexible split band, each of the free ends of the band being secured to one of said fastening members and the band lying flat against the top surface of the plate between the fastening members and the adjacent ends of the plate, and means for drawing one free end of the band relative to the plate to secure the clamp in position.

2. A pipe clamp comprising a rigid arcuate plate to fit the pipe, a fastening member on the top surface of the plate adjacent each end thereof, one fastening member being movable relative to the other and comprising an L-shaped member pivoted at its apex in sliding relation upon the surface of the arcuate member, and a flexible split band secured at its free ends to the fastening members In testimony whereof I have hereunto affixed my signature.

CHARLES ALBERT FRAZIER.